United States Patent
Yates

(10) Patent No.: US 6,555,214 B1
(45) Date of Patent: Apr. 29, 2003

(54) RESILIENT CUSHION

(76) Inventor: Paul M. Yates, 5814 Briar Tree, La Canada, CA (US) 91011

( * ) Notice: Subject to any disclaimer, the term of this patent is extended or adjusted under 35 U.S.C. 154(b) by 0 days.

(21) Appl. No.: 09/964,015

(22) Filed: Sep. 26, 2001

Related U.S. Application Data

(60) Division of application No. 09/510,165, filed on Feb. 22, 2000, now Pat. No. 6,319,441, which is a continuation-in-part of application No. 09/089,746, filed on Jun. 3, 1998, now Pat. No. 6,027,674.

(51) Int. Cl.⁷ .................................................. B32B 3/26
(52) U.S. Cl. .............................. 428/314.4; 428/314.8; 428/319.3; 428/308.4
(58) Field of Search ........................... 428/308.4, 314.4, 428/314.8, 319.3

(56) References Cited

U.S. PATENT DOCUMENTS 5,633,286 A * 5/1997 Chen ........................... 132/321
6,093,468 A * 7/2000 Toms et al. ...................... 2/22

* cited by examiner

*Primary Examiner*—Terrel Morris
*Assistant Examiner*—Hai Vo
(74) *Attorney, Agent, or Firm*—Walter A. Hackler

(57) ABSTRACT

A method for making a resilient material includes providing a particulate polymer, discrete pieces of foam and a plasticizer. The polymer, foam pieces and plasticizer are mixed and disposed in a mold. The mold is heated to cause melting of the polymer without melting of the foam. After coating of the melted polymer, a heterogeneous resilient cushion is formed with gelated polymer surrounding the discrete foam pieces.

4 Claims, 1 Drawing Sheet

RESILIENT CUSHION

The present application is a division of U.S. Ser. No. 09/510,165 now U.S. Pat. No. 6,319,441, filed Feb. 22, 2000, which is a continuation-in-part of U.S. Ser. No. 09/089,746 filed Jun. 3, 1998 now U.S. Pat. No. 6,027,674.

The present invention generally relates to resilient cushions or materials and a method of manufacturing same. More particularly, the present invention provides for the manufacture of articles having controlled resilient properties through the combination of various gels and forms.

The properties of gel/foam combinations are important in a variety of manufactured items. For example, resilient cushion materials find application in numerous toys, bicycle seats, therapeutic hand exercising grips, shock absorbers, acoustical insulators, vibration dampers, wrappers, hand exercisers, crutch cushions, cervical pillows, bed wedge pillows, leg rest cushions, neck cushions, bed pads, elbow pads, elbow pads, wheelchair cushions, and many pads including floor pads, orthopedic shoe soles, brace cushions and numerous other objects of manufacture.

An article formed from the combination of gel and foam can have its resilient properties tailored through the use of foam of different sizes as well as resiliency depending upon the use and function of the resulting article.

As an example, foam pore size may have a significant influence on a composite resiliency. A discussion of gel foam combinations may be had from U.S. Pat. No. 5,633,286, which is incorporated herewith by the specific reference thereto, for describing the advantages of a gel/foam combination article.

SUMMARY OF THE INVENTION

A method for making a resilient cushion, which may take the form of any of the hereinabove recited articles, generally comprises the steps of providing a polymer in particulate form and discrete pieces of form and discrete pieces of foam material. The particulate polymer and foam pieces are tumbled to provide a heterogeneous mixture.

A quantity of discrete pieces of foam material are provided in a selected size and thereafter the particulate polymer and foam pieces are tumbled to provide a heterogeneous mixture.

The heterogeneous mixture with plasticizer is introduced into a mold, which is thereafter heated, in order to cause melting of the polymer without melting of the foam. In this manner, the gelation of the melted polymer surrounds and encapsulates the foam particles and the heterogeneous mixture is not heated sufficiently to melt or degrade the foam pieces therein.

The melted polymer is allowed to gelate around the foam to cause a heterogeneous resilient cushion. Alternatively, the mixture may be passed through heated rollers which act as a continuous mold in order to form a sheet-like article or cushion.

Alternatively, a method for making a resilient cushion, which may take the form of any of the hereinabove recited articles, may generally comprise the steps providing a polymer in particulate form and adding a plasticizing oil thereto in a mixer or the like. Plasticizing oil is added in a quantity less than that to agglomerate the polymer articulate so that the resulting mixture of plasticizing oil and polymer particulate remains in a discrete granular, flake or particle form.

A quantity of discrete pieces of foam material are provided in a selected size and thereafter the particulate polymer and foam pieces are tumbled to provide a heterogeneous mixture.

The heterogeneous mixture with plasticizer is introduced into a mold, which is thereafter heated, in order to cause melting of the polymer without melting of the foam. In this manner, the gelation of the melted polymer surrounds and encapsulates the foam particles and the heterogeneous mixture is not heated sufficiently to melt or degrade the foam pieces therein.

The melted polymer is allowed to gelate around the foam to cause a heterogeneous resilient cushion. Alternatively, the mixture may be passed through heated rollers which act as a continuous mold in order to form a sheet-like article or cushion.

More particularly, the step of providing particulate polymer may comprise the providing of a triblock copolymer elastomer in particulate form and the plasticizer may be added in the form of a plasticizing oil.

Still more particularly, the step of heating the, mold may include heating the mold to a temperature of between 150° C. and about 200° C.

Preferably, the step of providing discrete pieces of foam material includes providing a closed cell foam.

In an alternative embodiment of the present invention, a first amount of polymer in particulate form is mixed with a first amount of plasticizer and disposed in a mold. A second amount of particulate polymer is provided along with a second amount of foam pieces which are mixed or tumbled therewith, along with a plasticizer.

The second amount of copolymer along with the foam pieces and plasticizer are added to the mold without substantial commingling with the first amount of particulate polymer. Thereafter, the mold is heated to cause melting of both amounts of the polymer without melting the foam. The copolymer is allowed to cool and gelate with the first amount of melted polymer gelling into a homogeneous gel in the second amount of melted polymer gelling around the foam pieces to form a heterogeneous resilient cushion.

In addition, the present invention also encompasses a resilient cushion which is made in accordance with the hereinabove recited steps as well as a composition which when heated form a resilient material or cushion.

The present invention also includes the use of foaming agents in order to reduce the density of the resilient cushion.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
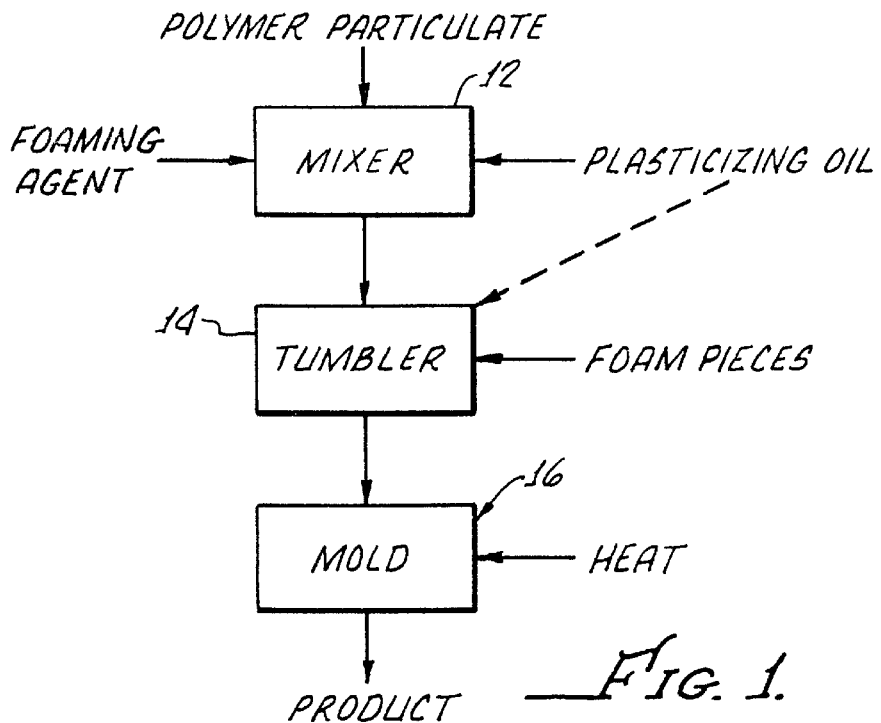
FIG. 1 is a block diagram in accordance with the method of the present invention.

Useful polymers in particulate form suitable for the present invention include triblock copolymers which are suitable in the forcing of gel components. Such polymers can have a wide range of resilient properties when used with varying amounts of plasticizer, for example, plasticizer oil, as is well know in the art. Such triblock copolymers include:

SEBS gels; examples include (a) Kraton G 1651.G 1654X gels; (b) Kraton G 4600 gels; (c) Kraton G 4609 gels; (d) Tuftec H 1051 gels; (e) Tuftec H 1041 gels; (f) Tuftec H 1052 gels.

Gels made from blends (polyblends) of (a)–(f) with other polymers and copolymers include: SEBS-SBS gels; SEBS-SIS gels; SEBS-(SEP) gels; SEBS-(SB)n gels; SEBS-(SEB)n gels; SEBS-(SI)n gels; SEBS-(SI) multiarm gels; SEBS-branched copolymers gels; SEBS-star shaped copolymer gels; gels made from blends of (a)–(f) with other homopolymers include: SEBS/polystyrene gels; SEBS polybutylene gels; SEBS/polyethylene gels; SEBS/polypropoylene gels.

Other suitable thermoclastic elastomers in blends suitable for making gels included SEP/SEBS oil gels, SEP/SEP oil gels, SEP/SEP/SEB oil gels, SEPS/SEBS/SEP oil gels, SEB/SEBS, EB-EP/SEBS, SEBS/EB, SEBE/EP, SEPS/SEB, etc.

The following commercial elastomers can be formed with oil and in combination with other polymers into suitable gels for use in making the gel components of the composites of the invention: Shell Kratons D1101, D1102, D1107, D1111, D1112, D1113X, D1116, D1117, D1118X, D1122X, D1125X, D113X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1705, G2721X, G7155, G7430, G7450, G7523X, G7528X, G7680, G7705, G7705, G7702, G7720, G7722X, G7820, G7821X, G7827, G7890X, G7940: Kuraray's SEP/SEPS/SEEPS: Nos. 1001(SEP), 2002 (SEPS), 2003(SEPS), 2023(SEPS), 2043(SEPS), 2063 (SEPS), 2005(SEPS), 2006(SEPS), 1050(SEP), 2103 (SEPS), 2104(SEPS), 2105(SEPS), and 4055(SEEPS) manufactured by Kuraray Co., Ltd., wherein SEP is made from hydrogenated styrene isoprene di-block copolymer (SI).

SEPS is made from hydrogenated styrene isoprene tri-block copolymer (SIS), and SEEPS is made from hydrogenated styrene isoprene/butadiene block copolymer or more specifically made from hydrogenated styrene block polymer with 2-methyl-1.3 butadiene and 1.3 butadiene.

The most preferred gels forming the composites of the invention comprise a high viscosity triblock copolymers which have the more general configuration A-B-A wherein each A is a crystalline polymer end block segment of ploystyrene; and B is an elastomeric polymer center block segment of poly(ethylene-butylene). The poly(ethylene-butylene) and polystyrene portions are incompatible and form a two-phase system consisting of sub-mocron domains of glassy polystyrene interconnected by flexible poly (ethylene-butylene) chains. These domains serve to crosslink and reinforce the structure. This physical elastomeric network structure is reversible, and heating the polymer above the softening point of polystyrene temporarily disrupt the structure, which can be restored by lowering the temperature. This also applies to high viscosity poly (styrene-ethylene-propylene-styrene) triblock copolymers.

Various mixtures of polymer may by used as taught in U.S. Pat. No. 5,633,286 hereinabove cited and incorporated herein by reference.

Plasticizers particularly preferred for use in practicing the present invention are well known in the art, and they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

Examples of representative commercially oils include Amoco® polybutenes, hydrogenated polybutenes and polybutenes with epoxide functionality at one end of the polybutene polymer. Examples of such polybutenes include L-14(320 Mn), L-50(42 Mn), L-100(460 Mn), H-15(56 Mn), H-25(610 Mn), H-35(660 Mn), H-50(750 Mn), H-100(920 Mn), H-300 (129)Mn), L-14E (27–37 cst @ 100° F. Viscosity), H-300E (635–690 cst @ 210° F. Viscosity), Actipol E6 (365 Mn), E16 (973 Mn), E23 (1433 Mn) and the like. Example of various commercially oils include: ARCO Prime (55, 70, 90, 200, 350, 400 and the like), Duraprime and Tufflo oils (6006, 6016, 6016M, 6026, 6036, 6056, 6206, etc), other white mineral oils include: Bayol, Bernol, American, Blandol, Drakeol, Ervol, Gloria, Kaydol, Litetek, Lyondell (Duraprime 55, 70, 90, 200, 350, 400, etc), Marcol, Parol, Peneteck, Primol, Protol, Sonrex, and the like.

Turning now to FIG. 1, there is shown a block diagram of the method in accordance with the present invention. Utilizing any of the hereinabove recited polymer particulates and plasticizers, a mixer 12 is provided for disbursing the plasticizing oil in the polymer particulates. It is important that the polymer particulate maintain its individual flake or pellet structure and accordingly, plasticizing oil should not be added in an amount to degrade the particular characteristics of the particle.

Thereafter, a tumbler 14 provides for mixing the polymer particulate with discrete foam pieces. Alternatively, as shown in dashed line in FIG. 1, the plasticizer oil may be introduced into the tumbler with the ploymer particulate to provide a one-step tumbling/mixing action. The tumbling is continued until the foam pieces are entirely coated or surrounded by polymer particulate.

It should be appreciated that the characteristics of the resultant product and are dependent upon this heterogeneous mixture of polymer of foam pieces and accordingly, the size of the size of the foam particles may be from about ⅛ inch to about 1 inch.

The shape of foam pieces may be spherical, however, a preferred shape is cylindrical. This shape facilitates the cutting of the foam pieces from a flat piece of foam material. The resiliency of the foam material may be from about ½ to about 2 lbs/sq. ft. for hand cushions to form about 4 to about 6 lbs/sq.ft. for floor cushions or mats. This, of course, depends upon the size and shape of the final product, the thickness of the final product and the desired resilient properties.

Preferably, the foam is a closed cell plastic of common usage such as ployamides, polyimedes, polyesters, polyisocyanurates, polyisocyanates, polyurethanes, poly (vinyalcohol), for any suitable material.

The homogeneous material, or composition, may be stored for use at a later time. Alternatively, the mixture may be passed into a mold 16, or the like, which is heated in order to cause melting of the polyparticulate around a discrete foam pieces 20, see FIGS. 2–4. Heating is preferably to a temperature of between about 150° C. to about 200° C. The melting temperature of the polymer should be less than the melting temperature of the foam pieces 20.

It should also be appreciate that the mold 16, while indicated as a batch type mold, maybe a continuous type mold for the production of sheet cushions or the like.

Figure 2:
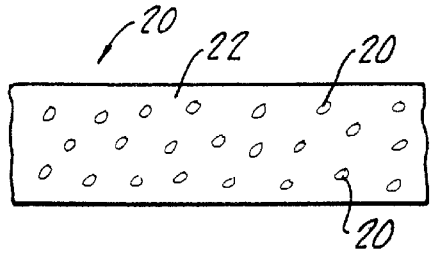
FIG. 2 is a representation of a resilient cushion made in accordance with the present invention which includes a heterogeneous cushion including discrete pieces of foam surrounded by a gelated polymer.

After cooling of the mold, the product 21, see FIG. 2, is produced, which includes gelated polymer 22 surrounding discrete pieces of foam 20, it should be appreciated that the product resilient material, i.e. cushion 21, may be of any size or shape and accordingly the representation in FIG. 2 is primarily for showing the disbursement of foam particles 20 within a gelated polymer 22.

Figure 3:
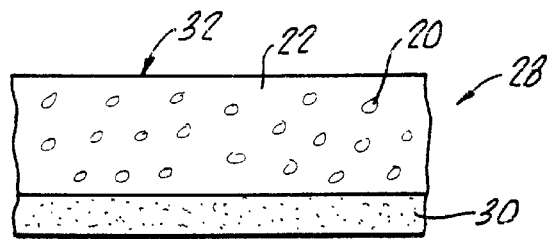
FIG. 3 is an alternative embodiment of the present invention in which a resilient cushion is formed, similar to that shown in FIG. 1, but with a gelatinous base on one side thereof.

Turning now to FIG. 3, an alternative embodiment 28 made in accordance with the present invention includes a layer 30 of gelated polymer which may be disposed into the mold 16 prior to the addition of the heterogeneous mixture of polymer 22 and foam pieces 20. In this configuration, the layer 30 provides a firm support for an overlying cushion 32 of gelated polymer 22 and foam pieces 20.

Since the resiliency, or rigidity of the polymer may be controlled through the use of plasticizing oil, the layer 30 may be rigid, or may be flexible, depending upon the end use of the product 28.

Figure 4:
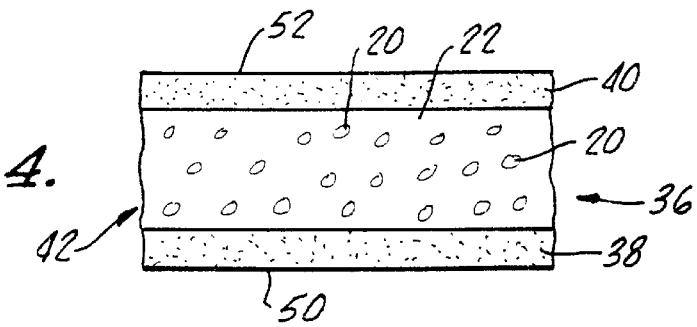
FIG. 4 is again an alternative embodiment of the present invention, similar to that shown in FIG. 3, but with a gelatinous top layer so that the foam/gel combination lies between distinct layers of gelate polymers.

A further embodiment 36 of the present invention is shown in FIG. 4 in which there are two layers 38, 40 of polymer with a heterogeneous layer 42 of gel 22 and discrete pieces of foam 20. In this configuration, the product 36 may be used as a shock absorber, or depending upon the thickness of the layers 38, 40, it may be used as a cushion having abrasion resistant of surfaces 50, 52, because of the superior strength provided by the polymer layers 38, 40.

It is important to appreciate that the present invention may be distinguished over the prior art and that it utilizes a closed cell foam and a process of which provides for melting and gelating the polymer around the foam without melting or physical deterioration of the foam pieces.

A foaming agent may be used to reduce the density of the cushion 32. Suitable foaming agents for use in the present invention includes microspheres filled with a propellant as sold by Expancel of Sundsvall, Sweden under the trade name Expancel 092 MB 120. This particular foaming agent is in powder form and is useful with SEBS gels. The foaming agent should be of a type being effective below the melting temperature of the foam material.

The propellant is finely distributed in the microspheres and gives a controlled foaming process. The foaming agent is added in an amount less than 10% by weight of the final mixture and preferably between about 1% and about 4%. Again, the final mixture, or composition may be stored or shipped before melting thereof to form a resilient material or cushion.

Although there has been hereinabove described a particular arrangement of making a resilient material in accordance with the present invention, for the purpose of illustrating the manner in which the invention may be used to advantage, it should be appreciated that the invention is not limited thereto. Accordingly, any and all modifications, which may occur to those skilled in the art, should be considered to be within the scope of the present invention as defined in the appended claims.

What is claimed is:

1. The resilient cushion comprising:

a first layer of gelated polymer; and a second layer comprising a heterogeneous mixture of gelated polymer, discrete pieces of foam and foaming agent, said gelated polymer surrounding each piece of foam, the foam being of closed cell structure and the discrete pieces of foam being sized to control resilient characteristics of the resilient cushion.

2. The resilient cushion according to claim 1 wherein a size of the foam pieces is between about 1/8 inch and about 1 inch.

3. The resilient cushion according to claim 2 wherein a resiliency of the foam pieces is between about 1/2 lbs/sq ft to about 2 lbs 1 sq ft to provide a resiliency of the cushion suitable for hand use.

4. The resilient cushion according to claim 2 wherein a resiliency of a foam piece is between about 4 lbs/sq ft to about 6 lbs/sq ft to provide a resiliency of the cushion suitable for floor mats.

\* \* \* \* \*